May 9, 1939.  W. R. KNOX  2,157,762
MACHINE TOOL
Filed June 4, 1937
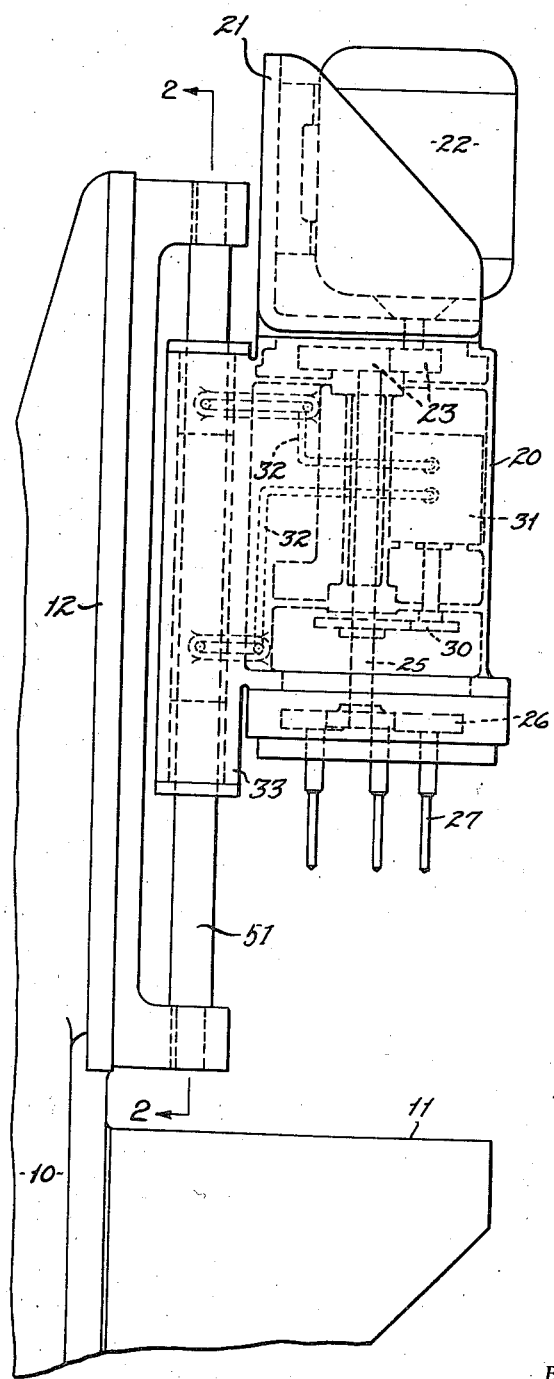
FIG. 1
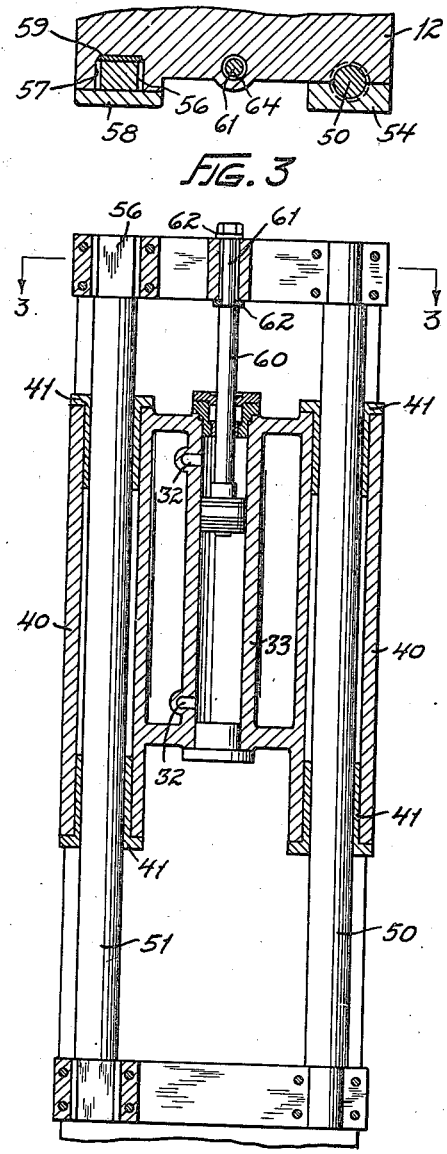
FIG. 3
FIG. 2
INVENTOR.
BY WILLIAM R. KNOX
Bates, Golrick, & Teare
ATTORNEYS Patented May 9, 1939

2,157,762

UNITED STATES PATENT OFFICE 2,157,762

MACHINE TOOL

William R. Knox, Cleveland, Ohio, assignor to The Foote-Burt Company, Cleveland, Ohio, a corporation of Ohio Application June 4, 1937, Serial No. 146,459

5 Claims. (Cl. 308—4)

This invention relates to a machine tool, and especially to a mounting for a tool driving and feeding unit, as, for instance, a drilling, tapping, boring or milling cutter unit.

At the present time machine tools, such as drilling machines and the like, must perform their various functions with an extremely high degree of accuracy. This is especially true in connection with machines used in the manufacture of automotive units or articles for similar lines of endeavor.

It is common practice to mount a power unit, for instance, a drilling unit, on suitable stationary guideways or bars formed on a relatively stationary machine tool frame. In many instances, the tool unit comprises a carriage which supports the tool, a motor, a change speed or other power-transmission unit for transmitting power from the motor to the tool. Such a self-contained unit increases the accuracy of the work performed by the machine, in that it eliminates the inaccuracies caused by the use of a driving connection between the reciprocating tool unit and the machine frame.

In some machine tools the accuracy of the machine is increased further by mounting a cylinder on the power unit, a cooperating piston on the machine frame, and by providing the tool unit with a hydraulic pump. This pump is connected with the cylinder carried by the tool unit, to effect the raising and lowering of the tool unit into and out of contact with the work. Such an arrangement eliminates all mechanical driving connections between the machine frame and the movable tool carrier, thereby further increasing the efficiency and accuracy of the machine. A machine tool of this type is the subject matter of Patent No. 1,904,975, issued to my assignee, The Foote-Burt Company, April 18, 1933.

The demand for a higher degree of accuracy constantly increases, with the decreasing of the tolerances allowed for machine tool operations. However, it becomes more and more difficult to locate the source that causes such inaccuracies, to thus enable the accuracy of the machine tools to be increased. I have found that in metal cutting machines of the type heretofore mentioned, even though the guides which support and guide the tool unit in its reciprocating movement, as well as the guide coacting members of the tool unit, are made with the highest degree of accuracy possible, they, nevertheless, may lead to inaccurate results. In some instances these guides have been provided with adjustments, but such adjustments as have been provided have not overcome the inaccuracies of the tool. Therefore, the general object of the present invention is to provide a mounting for a reciprocating machine tool unit, which will increase the efficiency and accuracy of the tool, to enable an extremely high degree of accuracy in the machine operations to be effected.

When the guides or ways on which the tool unit reciprocates are made as accurately as possible, the machine may function with a high degree of accuracy when it is initially put into operation. However, after continued operations over any prolonged interval of time, this inaccuracy is impaired. This is true, even though the position of the tools are from time to time checked.

I have found that the inaccuracy above mentioned results from a binding action between the guides, which, while hardly perceptible, nevertheless affect the accuracy of the tool operations, in that the movement of the tool toward and through the work becomes uneven, due to such binding. I have further found that this binding action is caused by the expansion of the unit itself, due to heat transmitted to the metal of the unit by the various driving and operating mechanisms carried thereby. This is especially true where the unit includes the driving motor, an oil pumping mechanism for causing the reciprocating of the unit, and gearing for driving the various tools. While the expansion of the frame or body of the unit is slight, it nevertheless is greater than the tolerances permitted in the guideway. Obviously, this expansion places a definite limit upon the accuracy of the fit between the guides.

It has been found that it is possible to fit the guides with a much higher degree of accuracy than that permitted to enable a free sliding movement of the tool. It is an object of the present invention, therefore, to provide a guide mechanism for a reciprocating tool unit, in which the guides may be machined, and fit as accurately as possible, without regard to the expansion or contraction of the tool unit.

I prefer to accomplish the above mentioned object by so fitting the guides in their respective guideways as accurately as possible. I then fix one of the guides rigidly to the machine frame, and I so mount the other guide on the frame that it may shift in a direction parallel with the major direction of expansion of the tool unit, and may thus change its position under the impulse of such expansion, thereby enabling at all times free movement of the tool on the guides, even though the guides be made with such a high degree of accuracy that they would not otherwise take up the expansion of the unit.

It will be seen that such a mounting has a special advantage on machine tools of the type wherein the tool driving motor and the tool reciprocating power mechanism, as well as the tool driving mechanism, is mounted on the moving unit. This is due to the additional heat generated by such power operating mechanism. Furthermore, when the tool unit is reciprocated by a hydraulic unit, I prefer to mount the piston on the machine frame in such a manner that it may move slightly in all directions, thus enabling it to follow the expansion on the unit imparted to the cylinder carried thereby and which coacts with the piston carried by the frame to raise and lower the unit relative to the frame.

Other objects and advantages of this application will become more apparent from the following description, reference being had to a preferred embodiment of the invention illustrated in the drawing. The essential novel features of the invention will be summarized in the claims.

Referring now to the drawing, Fig. 1 is a side elevation of a machine tool, embodying my invention; Fig. 2 is a vertical section, the plane of the section being indicated by the line 2—2 on Fig. 1; Fig. 3 is a horizontal section, as indicated by the line 3—3 on Fig. 2.

Referring now to the drawing, I have indicated my invention as applied to a metal-cutting machine, and especially to a drilling mechanism of the type shown in the prior patent heretofore mentioned. In general, this mechanism comprises a frame 10, provided with a work-supporting table 11, and an upright extension 12 which carries the guides on which the tool unit reciprocates.

The tool unit is generally indicated at 20, and comprises a frame 21 supporting, at its upper end, an electric motor 22, which is connected by gearing 23, with a vertically extending shaft 25, which in turn is connected by spur gears 26, with the various tools or drills 27. Drivingly connected to the shaft 25 by gearing 30 is a hydraulic pump 31. This pump is connected by suitable conduits, generally indicated at 32, with a hydraulic cylinder 33, rigidly secured to the unit frame 21. Suitable valve mechanism (not shown) is provided to control the reciprocation of the unit by controlling the flow of fluid to and from the cylinder 33.

The guides or supporting mechanism for the tool unit with which this invention is especially concerned will now be described. As shown in the drawing, the frame 21 has two rearwardly extending bosses 40, each of which has secured thereto, adjacent its upper and lower ends, bearing members 41. These bearing members are slidably mounted on respective vertically extending bars 50 and 51. The fit between the bearing members and the bars being as accurate as is possible.

As shown in Figs. 1 and 2, the right-hand bar 50 is securely fixed, adjacent its upper and lower ends, by cap members 54 to the frame 12 of the machine. The left-hand bar 51, however, is flattened at its opposite ends, as indicated at 56, and is mounted for sliding movement toward and away from the bar 50 in guideways 57 formed in the frame 12. The bar 51 is retained in the guideways 57 by caps 58. A wearing plate 59 is provided at the rear of each guideway 57 to maintain the accuracy of the sliding movement of the bar. It will thus be noted that as heat is generated, by the motor, the pump and the gearing, causes the unit frame member 21 to expand, and it may bodily shift the guide or bar 51, thereby preventing any binding action on the guides.

Coacting with the cylinder 33 of the tool unit 21, is a piston 60, the upper end of which is secured to the frame 12. As illustrated in Figs. 2 and 3 the piston is provided with a reduced portion 61 which passes through an opening 64 formed in the frame 12, and is restrained against axial movement by collars 62 secured to the piston in any well-known manner. The arrangement, however, is such that the opening 64 in the frame through which the piston extends is slightly larger than the portion 61 of the piston, to the end that the piston may shift slightly in any direction to compensate for expansion of the frame and attendant movement of the cylinder.

From the foregoing description it will be seen that my improved guide and supporting mechanism will automatically compensate for temperature changes, whether they be caused by changes in climatic conditions or by heat generated by the tool driving unit, thereby enabling a high degree of accuracy to be maintained and at the same time eliminating the setting up of strains in the tool unit which might be caused by the binding of the unit on its guides.

I claim:

1. In a metal cutting machine, a main frame member, a tool carrier member reciprocably mounted on said frame member, a pair of guides carried by said frame member to guide said tool carrier member during its reciprocation, a pair of guides carried by said carrier member and coacting with the first-named guides respectively, three of said guides being fixedly secured to their respective members, and wherein the fourth guide is mounted in its member for free movement toward and away from the other guide of its respective pair of guides.

2. In a machine tool, a main frame, a pair of guides carried by said frame, a tool carrier reciprocably mounted on said guides, one of said guides being fixedly secured to said frame against movement in any direction, the other guide being mounted in said frame for free movement toward and away from the fixed guide, means to prevent movement of the movable guide in any other direction than that named, and means carried by the carrier bridging the two guides and maintaining the movable guide substantially in alignment with the fixed guide.

3. In a machine tool, a main frame member, a pair of guides carried by said frame, a tool carrier member reciprocably mounted on said guides, one of said guides being fixedly secured to the main frame, the other guide being mounted in said frame to float toward and away from the fixed guide, a piston carried by one member, a coacting cylinder fixedly carried by the other member and having its axis disposed in the plane of said guides, said piston being mounted in its respective member to float toward and away from said fixed guide.

4. In a metal cutting machine, a main frame, a guide bar having its opposite ends fixed to said main frame, a second guide bar, means carried to said main frame to support said second named bar in such manner as will permit it to move toward and from the other bar in planes parallel with a plane intersecting the axes of said bar while holding it immovable in all other directions, and a tool carriage provided with a pair of guideways adapted to embrace the respective bars in such a manner as to permit only axial sliding movement between the bars and the respective guideways, whereby said tool carriage will be maintained in precise alignment and definitely located relative to the main frame by the fixed guide bar while free to move axially though expanded by heat by reason of the permitted movement of the second named bar, said second named bar also assisting in maintaining precise alignment between the tool carriage and the frame.

5. In a metal cutting machine, a main frame, a vertically extending cylindrical guide bar having its opposite ends fixedly secured to said main frame, a pair of vertically spaced vertically extending rectangular guideways, said guideways being spaced from and in axial alignment with the first named guide bar and provided with a pair of spaced side walls parallel with a plane intersecting the axes of the guideways and the axis of the first named guide bar, said guideways having a second pair of spaced parallel sidewalls extending in a direction normal to the said plane, a second guide bar having reduced rectangular ends mounted in respective guideways, and provided with faces adapted to intimately engage the first named pair of walls thereof, said last named bar being of less width than the distance between the second named pair of walls of said guideways whereby movement of said bar is prevented in all directions except on a plane parallel with said last named plane, and a tool carriage slidably mounted for vertical movement on both of said guide bars.

WILLIAM R. KNOX.